(12) United States Patent
Kaneko et al.

(10) Patent No.: US 11,718,807 B2
(45) Date of Patent: Aug. 8, 2023

(54) HYDROPHILIC SLIPPERY TREATMENT AGENT AND SURFACE TREATMENT METHOD

(71) Applicants: NIPPON PAINT SURF CHEMICALS CO., LTD., Tokyo (JP); NATIONAL INSTITUTE OF ADVANCED INDUSTRIAL SCIENCE AND TECHNOLOGY, Tokyo (JP)

(72) Inventors: Souhei Kaneko, Tokyo (JP); Masaki Matsuzaki, Tokyo (JP); Atsushi Hozumi, Nagoya (JP); Chihiro Urata, Nagoya (JP)

(73) Assignees: NIPPON PAINT SURF CHEMICALS CO., LTD, Tokyo (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 17/422,660

(22) PCT Filed: Jan. 23, 2020

(86) PCT No.: PCT/JP2020/002407
§ 371 (c)(1),
(2) Date: Jul. 13, 2021

(87) PCT Pub. No.: WO2020/153447
PCT Pub. Date: Jul. 30, 2020

(65) Prior Publication Data
US 2022/0119723 A1    Apr. 21, 2022

(30) Foreign Application Priority Data
Jan. 24, 2019    (JP) ................. 2019-010533

(51) Int. Cl.
*C10M 105/76* (2006.01)
*F28F 21/08* (2006.01)
*C09D 171/02* (2006.01)
*C10N 50/08* (2006.01)

(52) U.S. Cl.
CPC ......... *C10M 105/76* (2013.01); *C09D 171/02* (2013.01); *F28F 21/089* (2013.01); *C10M 2227/003* (2013.01); *C10M 2227/045* (2013.01); *C10N 2050/08* (2013.01)

(58) Field of Classification Search
CPC .......... C10M 105/76; C10M 2227/003; C10M 2227/045; C10N 2050/08; C09D 171/02; F28F 21/089
See application file for complete search history.

(56) References Cited

U.S. PATENT DOCUMENTS

| 6,958,172 | B2* | 10/2005 | Shirakawa | ........... | C08G 65/329 |
| | | | | | 528/29 |
| 2003/0129422 | A1 | 7/2003 | Shirakawa et al. | | |
| 2004/0006190 | A1 | 1/2004 | Sakamoto | | |
| 2006/0252903 | A1* | 11/2006 | Wakabayashi | ........ | C08L 101/10 |
| | | | | | 528/34 |
| 2015/0011723 | A1 | 1/2015 | Prasse | | |
| 2016/0032146 | A1 | 2/2016 | Hozumi | | |

FOREIGN PATENT DOCUMENTS

| CN | 1429865 A | | 7/2003 |
| CN | 1751153 A | | 3/2006 |
| CN | 105016624 A | * | 11/2015 |
| CN | 105016624 A | | 11/2015 |
| EP | 1852523 A1 | | 11/2007 |
| JP | 01223175 A | * | 9/1989 |
| JP | H01249863 A | | 10/1989 |
| JP | 2000239607 A | | 9/2000 |
| JP | 2001172502 A | | 6/2001 |
| JP | 2004043521 A | | 2/2004 |
| JP | 2004256586 A | | 9/2004 |
| JP | 2009084319 A | | 4/2009 |
| JP | 2009144089 A | | 7/2009 |
| JP | 2013213181 A | | 10/2013 |
| JP | 2014141625 A | | 8/2014 |
| JP | 2015516368 A | | 9/2014 |
| JP | 2016155923 A | | 9/2016 |
| WO | WO-2006082946 A1 | | 8/2006 |
| WO | WO-2014136275 A1 | | 9/2014 |

* cited by examiner

*Primary Examiner* — James C Goloboy
(74) *Attorney, Agent, or Firm* — Muncy, Geissler, Olds & Lowe, P.C.

(57) ABSTRACT

A hydrophilic slippery treatment agent which allows for the formation of a coating having hydrophilicity concurrently with water droplet removability via drying at lower temperatures, a surface treatment method using the hydrophilic slippery treatment agent, a substrate having a hydrophilic slippery coating formed thereon by the surface treatment method, and a fin material for a heat exchanger having a hydrophilic slippery coating formed thereon by the surface treatment method are provided.

The treatment agent contains an organosilicon compound with a specific structure including both a hydrophilic-chain-containing group and a hydrolyzable group, and a metal alkoxide.

11 Claims, No Drawings

HYDROPHILIC SLIPPERY TREATMENT AGENT AND SURFACE TREATMENT METHOD

TECHNICAL FIELD

The present invention relates to a hydrophilic slippery treatment agent, a surface treatment method using the hydrophilic slippery treatment agent, a substrate having a hydrophilic slippery coating formed thereon by the surface treatment method, and a fin material for a heat exchanger having a hydrophilic slippery coating formed thereon by the surface treatment method.

BACKGROUND ART

A technique of applying hydrophilization treatment to the surface of a metal substrate has been conventionally known. For example, in a heat exchanger made from aluminum, hydrophilization treatment is applied to the fin surface to prevent problems such as noise generation due to adhesion of condensate water to the fin surface and contamination due to water droplet splashing.

For example, a hydrophilization treatment agent containing a modified polyvinyl alcohol-based resin having an acetoacetyl group and an oxyalkylene group, and a crosslinking agent has been proposed as a hydrophilization treatment agent for use in hydrophilization treatment on a metal substrate (see Patent Document 1).
The hydrophilization treatment agent described in Patent Document 1 allows for formation of a coating excellent in not only hydrophilicity but also water resistance.

However, coatings excellent in hydrophilicity tend to stabilize condensate water and make removal of the condensate water more difficult.
In other words, coatings more excellent in hydrophilicity provide poorer water droplet removability.
In view of this, a hydrophilic paint containing a hydrophilic polymer (a) and a crosslinking agent (b) has been disclosed as a treatment agent excellent in hydrophilicity and removability of water droplet (see Patent Document 2).

However, the hydrophilic paint described in Patent Document 2 needs baking and drying at elevated temperatures for a curing reaction via the crosslinking agent to occur. Specifically, the baking should be typically performed at such an elevated temperature that the material reaches a temperature of up to about 150 to about 250° C., and preferably 190 to 240° C. (paragraph [0063] of Cited Publication 2).

On the other hand, a surface treatment agent capable of being dried at lower temperatures and forming a coating excellent in slippery property has also been proposed (see Patent Document 3).
The treatment agent described in Patent Document 3 contains an organic silane and a metal alkoxide, and forms a coating upon cohydrolysis and condensation polymerization thereof in a solution containing an organic solvent, water, and a catalyst.

However, the coating described in Patent Document 3 is not hydrophilic but hydrophobic, as shown by a contact angle of about 100°.
Thus, the coating described in Patent Document 3 cannot be applied to a material that requires a hydrophilic coating.

Patent Document 1: Japanese Unexamined Patent Application, Publication No. 2014-141625
Patent Document 2: Japanese Unexamined Patent Application, Publication No. 2016-155923
Patent Document 3: Japanese Unexamined Patent Application, Publication No. 2013-213181

DISCLOSURE OF THE INVENTION

Problems to be Solved by the Invention

The present invention was made in view of the background art described above, and an object of the present invention is to provide a hydrophilic slippery treatment agent which allows for the formation of a coating having hydrophilicity concurrently with water droplet removability via drying at lower temperatures, a surface treatment method using the hydrophilic slippery treatment agent, a substrate having a hydrophilic slippery coating formed thereon by the surface treatment method, and a fin material for a heat exchanger having a hydrophilic slippery coating formed thereon by the surface treatment method.

Means for Solving the Problems

The present inventors conducted extensive studies for solving the aforementioned problems.
Consequently, the present inventors found that a treatment agent containing an organosilicon compound with a specific structure including both a hydrophilic-chain-containing group and a hydrolyzable group, and a metal alkoxide can solve the problems described above, to accomplish the present invention.

More specifically, a first aspect of the present invention relates to a hydrophilic slippery treatment agent containing an organosilicon compound (A) having at least one silicon atom, at least one hydrophilic-chain-containing group and at least one hydrolyzable group, the at least one hydrophilic-chain-containing group and the at least one hydrolyzable group bonding to the at least one silicon atom, and a metal alkoxide (B), wherein the molar ratio (A/B) of the organosilicon compound (A) to the metal alkoxide (B) is 0.07 to 0.4.

The hydrophilic-chain-containing group may be a group represented by the following formula (1).

[Chem. 1]

(1)

In the formula (1), $R^1$ represents a hydrogen atom, an alkyl group, an alkoxy group, a cycloalkyl group, an alkenyl group, an aromatic hydrocarbon group, or a hydroxyl group, $R^2$ represents an alkylene group having 1 to 5 carbon atoms, wherein in the case where a plurality of $R^2$ are present in one hydrophilic-chain-containing group, the plurality of $R^2$ may be identical to or different from one another, n is an integer of 4 or more, and $R^3$ represents an alkylene group having 1 to 5 carbon atoms.

$R^2$ in the formula (1) may be an ethylene group.

$R^1$ in the formula (1) may be an alkoxy group.

$R^1$ in the formula (1) may be a methoxy group.

The hydrolyzable group may be an alkoxy group.

The hydrolyzable group may be a methoxy group.

The organosilicon compound (A) may have one hydrophilic-chain-containing group and three hydrolyzable groups, the one hydrophilic-chain-containing group and the three hydrolyzable groups bonding to the at least one silicon atom of the organosilicon compound (A).

A second aspect of the present invention relates to a surface treatment method including a hydrophilic slippery coating forming step of contacting the hydrophilic slippery treatment agent as described above with the surface of a substrate, the surface being desired to acquire hydrophilicity and a slippery property, to form a hydrophilic slippery coating.

The substrate may be made from aluminum.

The substrate may be a fin material for a heat exchanger.

A third aspect of the present invention relates to a substrate having a hydrophilic slippery coating formed on the surface thereof according to the surface treatment method as described above.

A fourth aspect of the present invention relates to a fin material for a heat exchanger having a hydrophilic slippery coating formed on the surface thereof according to the surface treatment method as described above.

Effects of the Invention

According to the hydrophilic slippery treatment agent of the present invention, a coating having hydrophilicity concurrently with water droplet removability can be formed via drying at lower temperatures without a need of baking and drying at elevated temperatures.

Therefore, a coating exhibiting both the hydrophilicity and the water droplet removability in a well-balanced manner can be produced under conditions of low temperatures, whereas both of the hydrophilicity and the water droplet removability have been conventionally difficult to achieve concurrently.

In addition, since the inventive hydrophilic slippery treatment agent can be dried under conditions of low temperatures, it can also be applied to less heat-resistant polymer substrates such as food packaging materials and agricultural films. Additionally, for building exteriors and window glass, and the like, the inventive hydrophilic slippery treatment agent can exhibit its performance when applied at a building site and dried at ambient temperature.

Further, the hydrophilic slippery treatment agent of the present invention can form a coating having excellent transparency.

Thus, the hydrophilic slippery treatment agent of the present invention can also be suitably applied to objects which should have transparency, such as window glass.

Therefore, the hydrophilic slippery treatment agent of the present invention has considerably great industrial applicability.

In addition, the hydrophilic slippery coating formed using the hydrophilic slippery treatment agent of the present invention has both the hydrophilicity and the water droplet removability, and thus exerts a self-cleaning function.

Therefore, a substrate having a hydrophilic slippery coating formed on the surface thereof by the hydrophilic slippery treatment agent of the present invention can be suitably applied to applications in which both the hydrophilicity and the water droplet removability are required and the self-cleaning function is desired, for example, a fin material for a heat exchanger, and the like.

PREFERRED MODE EUR CARRYING OUT THE INVENTION

Hereinafter, embodiments of the present invention will be explained.

<Hydrophilic Slippery Treatment Agent>

A hydrophilic slippery treatment agent of the present invention contains an organosilicon compound (A) having a silicon atom, at least one hydrophilic-chain-containing group and at least one hydrolyzable group, the at least one hydrophilic-chain-containing group and the at least one hydrolyzable group bonding to the silicon atom, and a metal alkoxide (B).

It should be noted that the hydrophilic slippery treatment agent of the present invention needs to contain the organosilicon con-pound (A) and the metal alkoxide (B) as essential components, as described above, but may contain other component(s).

[Organosilicon Compound (A)]

The organosilicon compound (A), which is one of the essential components of the hydrophilic slippery treatment agent of the present invention, has at least one silicon atom, at least one hydrophilic-chain-containing group and at least one hydrolyzable group, the at least one hydrophilic-chain-containing group and the at least one hydrolyzable group bonding to the at least one silicon atom.

In the hydrophilic slippery treatment agent of the present invention, the organosilicon compound (A) exerts a hydrophilic function.

The silicon atom is tetravalent, and thus up to four groups bond thereto.

In the present invention, at least one of the four groups is a hydrophilic-chain-containing group, and at least one of the four groups is a hydrolyzable group.

Therefore, the two remaining groups bonding to the silicon atom are not particularly limited, and each may be the hydrophilic-chain-containing group, the hydrolyzable group, or any other group.

In addition, when the organosilicon compound (A) has a plurality of the hydrophilic-chain-containing groups, or a plurality of the hydrolyzable groups, the hydrophilic-chain-containing groups may be identical to or different from one another and the hydrolyzable groups may be identical to or different from one another.

Among others, the organosilicon compound (A), which is one of the essential components of the hydrophilic slippery treatment agent of the present invention, preferably has one hydrophilic-chain-containing group and three hydrolyzable groups, the one hydrophilic-chain-containing group and the three hydrolyzable groups bonding to the silicon atom.

In addition, the three hydrolyzable groups may be identical to or different from one another.

It should be noted that the organosilicon compound (A) should contain at least one silicon atom as described above, and may contain a plurality of silicon atoms as described above.

For example, the organosilicon compound (A) may be a condensate formed via condensation of the silicon atoms as described above, and may be a mixture of different types of organosilicon compounds that each contain at least one silicon atom as described above.

(Hydrophilic-Chain-Containing Group)

The hydrophilic-chain-containing group in the organosilicon compound (A) is not particularly limited, but is preferably, for example, a group represented by the following formula (1).

[Chem. 2]

In the formula (1), $R^1$ represents a hydrogen atom, an alkyl group, an alkoxy group, a cycloalkyl group, an alkenyl group, an aromatic hydrocarbon group, or a hydroxyl group, $R^2$ represents an alkylene group having 1 to 5 carbon atoms, wherein in the case where a plurality of $R^2$ are present in one hydrophilic-chain-containing group, the plurality of $R^2$ may be identical to or different from one another,
n is an integer of 4 or more, and
$R^3$ represents an alkylene group having 1 to 5 carbon atoms.

In the hydrophilic-chain-containing group represented by the formula (1), a structural moiety of the repeating unit in which $R^2$ bonds to the oxygen atom plays a role in exhibiting the hydrophilicity. $R^2$ represents an alkylene group having 1 to 5 carbon atoms, wherein in the case where a plurality of $R^2$ are present in one hydrophilic-chain-containing group, the plurality of $R^2$ may be identical to or different from one another.

In addition, the alkylene group having 1 to 5 carbon atoms, which may be represented by $R^2$, may be linear or branched; when more favorable water droplet removability is desired, the alkylene group having 1 to 5 carbon atoms is preferably linear, and is particularly preferably an ethylene group, among others.

When $R^2$ represents an ethylene group, the water droplet removability can be ensured with high hydrophilicity.

In the hydrophilic-chain-containing group represented by the formula (1), the number of repetitions, n, of the unit in which R bonds to the oxygen atom is typically an integer of 4 or more, and preferably an integer of 4 to 12 from the viewpoint of the availability thereof.

When n is less than 4, the chain is too short to exhibit the hydrophilicity and thus the organosilicon compound (A) has lower hydrophilicity, which results in the formation of a coating exhibiting insufficient hydrophilicity.

Further, in the hydrophilic-chain-containing group represented by the formula (1), $R^1$ is a group located at the terminus of the hydrophilic-chain-containing group, and represents a hydrogen atom, an alkyl group, an alkoxy group, a cycloalkyl group, an alkenyl group, or an aromatic hydrocarbon group, or a hydroxyl group.

The alkoxy group is preferably an alkoxy group having 1 to 4 carbon atoms, such as a methoxy group, an ethoxy group, a propoxy group, and a butoxy group, and particularly preferably a methoxy group, among others.

When a methoxy group is present at the terminus of the above formula (1) which represents the hydrophilic-chain-containing group, the hydrophilic-chain-containing group represented by the formula (1) exerts a function of imparting the hydrophilicity to a higher extent.

In the hydrophilic-chain-containing group represented by the formula (1), $R^3$ is a moiety bonding to the silicon atom, and represents an alkylene group having 1 to 5 carbon atoms.

The alkylene group having 1 to 5 carbon atoms represented by $R^3$ is typically linear, and such a linear alkylene group can achieve more favorable water droplet removability.

(Hydrolyzable Group)

The hydrolyzable group in the organosilicon compound (A) is not particularly limited so long as the group gives a hydroxy group (silanol group) via hydrolysis.

In addition, in the organosilicon compound (A) of the present invention, at least one hydrolyzable group should bond to the silicon atom, and up to three hydrolyzable groups may bond to the silicon atom.

When two or three hydrolyzable groups bond to the silicon atom, the hydrolyzable groups may be identical to or different from one another.

The hydrolyzable group in the organosilicon compound (A) serves as a site which reacts with the metal alkoxide (B), which is one of the essential components of the hydrophilic slippery treatment agent. Further, the hydrolyzable group also serves as a site that is subjected to, in addition to the reaction with the metal alkoxide (B), a reaction with the substrate to which the hydrophilic slippery treatment agent is applied.

Therefore, the hydrolyzable group in the organosilicon compound (A) reacts with the internal components of the coating formed, and concurrently reacts with the substrate on which the coating is formed, leading an increase in the adhesion strength of the coating formed to the substrate.

Examples of the hydrolyzable group in the organosilicon compound (A) may include alkoxy groups, an acetoxy group, a chlorine atom, an isocyanate group, and the like.

Among others, the hydrolyzable group is preferably an alkoxy group having 1 to 4 carbon atoms such as a methoxy group, an ethoxy group, a propoxy group, or a butoxy group. Furthermore, the hydrolyzable group is preferably a methoxy group. When the hydrolyzable group is a methoxy group, an alcohol formed after hydrolysis is a small molecule, and thus contributes to drying at lower temperatures to a greater extent.

The content of the organosilicon compound (A) in the hydrophilic slippery treatment agent of the present invention is preferably 0.01 to 30% by mass, more preferably 0.05 to 20% by mass, and still more preferably 0.1 to 10% by mass based on the entire treatment agent.

[Metal Alkoxide (B)]

The metal alkoxide (B), which is one of the essential components of the hydrophilic slippery treatment agent of the present invention, is a compound in which an alkoxy group bonds to a metal atom, and exerts a hydrophobic function in the hydrophilic slippery treatment agent of the present invention.

The metal alkoxide (B) used in the present invention preferably has a structure represented by the following formula (2).

In addition, the metal alkoxide (B) used in the present invention may be a hydrolytic condensation product of the compound represented by the following formula (2). As used herein, the hydrolytic condensation product refers to a compound formed by hydrolysis and subsequent condensation of all or a part of the alkoxy groups included in the metal alkoxide (B).

[Chem. 3]

In the formula (2), M represents a trivalent or tetravalent metal atom,
a plurality of $R^4$ may be identical to or different from one another, and each $R^4$ represents an alkoxy group having 1 to 4 carbon atoms, and m is an integer of 3 or 4, depending on the valence of M.

Examples of a metal M that constitutes the metal alkoxide (B) include: trivalent metals such as Al, Fe, and In; tetravalent metal such as Hf, Si, Ti, Sn, and Zr; and the like.

Among these, the metal M is preferably Si from the viewpoint of the availability and storage stability thereof.

Further, when the metal M is a trivalent metal, three alkoxy groups $R^4$ bond to the metal M, and in other words, m in the formula (2) is 3.

Furthermore, when the metal M is a tetravalent metal, four alkoxy groups $R^4$ bond to the metal M, and in other words, m in the formula (2) is 4.

The alkoxy group represented by $R^4$ has preferably 1 to 4 carbon atoms, and the alkoxy group is most preferably an ethoxy group or a methoxy group, among others, from the viewpoint of greater ease of drying at lower temperatures.

In addition, when the hydrolyzable group in the organosilicon compound (A) is an alkoxy group, the alkoxy group in the organosilicon compound (A) and the alkoxy group in the metal alkoxide (B) may be identical or different.

The content of the metal alkoxide (B) in the hydrophilic slippery treatment agent of the present invention is preferably 0.01 to 30% by mass, more preferably 0.05 to 20% by mass, and still more preferably 1.0 to 10% by mass based on the entire treatment agent.

[Molar Ratio (A/B) of Organosilicon Compound (A) to Metal Alkoxide (B)]

In the hydrophilic slippery treatment agent of the present invention, the molar ratio (A/B) of the organosilicon compound (A) to the metal alkoxide (B), the organosilicon compound (A) and the metal alkoxide (B) being essential components of the hydrophilic slippery treatment agent, is preferably 0.07 to 0.4, and more preferably in the range of 0.15 to 0.3.

In the present invention, the metal alkoxide (b) forms spaces between the chain-like hydrophilic-chain-containing groups of the organosilicon compound (A), which allows for the formation of a coating exhibiting hydrophilicity and water droplet removability in a well-balanced manner, whereas both of the hydrophilicity and water droplet removability have been conventionally difficult to achieve concurrently.

When the molar ratio (A/B) of the organosilicon compound (A) to the metal alkoxide (B) is in the range of 0.07 to 0.4, appropriate spaces can be formed between the chain-like hydrophilic-chain-containing groups, which results in the achievement of both the hydrophilicity and the water droplet removability in a well-balanced manner.

[Other Components]

The hydrophilic slippery treatment agent of the present invention may optionally contain other components in addition to the organosilicon compound (A) and the metal alkoxide (B) as described above.

Other component is exemplified by a solvent, a catalyst, an additive, and the like.

Examples of the solvent include water, hydrophilic organic solvents such as alcohol-based solvents, ether-based solvents, ketone-based solvents, ester-based solvents, and amide-based solvents, and hydrophobic organic solvents such as aromatic-hydrocarbon-based solvents, and saturated-hydrocarbon-based solvents.

These solvents may be used alone or two or more types thereof may be used in combination.

The catalyst preferably acts as a hydrolysis catalyst, and examples thereof include acidic compounds such as hydrochloric acid, nitric acid and acetic acid, basic compounds such as ammonia and amines, organometallic compounds having a metal element as a central metal, and the like.

An additive that exhibits a desired function may be selected and blended as needed, without interfering with the effects of the present invention, and examples of the additive include antioxidants, antirust agents, ultraviolet ray-absorbing agents, light stabilizers, fungicides, antimicrobials, bioadhesion inhibitors, deodorants, pigments, flame retardants, antistatic agents, and the like.

It should be noted that the hydrophilic slippery treatment agent of the present invention is preferably prepared such that the total mass of the solid content accounts for about 10% of the mass of the entire treatment agent.

As explained hereinabove, the hydrophilic slippery treatment agent of the present invention contains the organosilicon compound (A) having at least one silicon atom, at least one hydrophilic-chain-containing group and at least one hydrolyzable group, the at least one hydrophilic-chain-containing group and the at least one hydrolyzable group bonding to the at least one silicon atom, and the metal alkoxide (B), wherein the molar ratio (A/B) of the organosilicon compound (A) to the metal alkoxide (B) is 0.07 to 0.4, hydrophilic slippery treatment agent.

According to the hydrophilic slippery treatment agent of the present invention, a coating having hydrophilicity concurrently with water droplet removability can be formed via drying at lower temperatures without a need of baking and drying at elevated temperatures.

<Surface Treatment Method>

A surface treatment method of the present invention includes a hydrophilic slippery coating forming step of contacting the hydrophilic slippery treatment agent of the present invention as described above, with the surface of a substrate, the surface being desired to acquire hydrophilicity and a slippery property, to form a hydrophilic slippery coating hydrophilic.

[Substrate]

A substrate to which the surface treatment method of the present invention can be applied is not particularly limited. The substrate is exemplified by those made of a resin. Examples of the resin include thermoplastic resins such as acrylic resins, polycarbonate resins, polyester resins, styrene resins, acryl-styrene copolymerization resins, cellulose resins, polyolefin resins, and polyvinyl alcohols, thermosetting resins such as phenolic resins, urea resins, melamine resins, epoxy resins, unsaturated polyesters, silicone resins, and urethane resins, and the like.

In addition, materials for the substrate include ceramics and glass, metals such as iron, silicon, copper, zinc, and aluminum, and furthermore, alloys containing the metal described above.

It should be noted that, before the hydrophilic slippery coating forming step, a degreasing step of degreasing the substrate and washing the degreased substrate with water may be conducted.

Alternatively, the substrate may be subjected to pretreatment such as adhesion-promoting treatment.

The adhesion-promoting treatment is exemplified by corona treatment, plasma treatment, ultraviolet ray treatment, primer treatment using a silane-based compound or resin, and the like.

The adhesion-promoting treatment can improve the adhesiveness of the hydrophilic slippery coating, leading to an improvement of the durability thereof.

For example, an application in which both hydrophilicity and water droplet removability are required and a self-cleaning function is desired is exemplified by a fin material for a heat exchanger. The surface treatment method of the present invention can be suitably applied to aluminum, which may be a base material of the fin material for a heat exchanger.

In addition, the shape of the substrate is not particularly limited, and the substrate may have, for example, a plane, a curved surface, or a three-dimensional structure formed of a combination of a number of surfaces.

[Hydrophilic Slippery Coating Forming Step]

In the hydrophilic slippery coating forming step, the hydrophilic slippery treatment agent of the present invention is contacted with the surface of a substrate, which may be pretreated as needed, to form a hydrophilic slippery coating.

A method for contacting the hydrophilic slippery treatment agent of the present invention is not particularly limited, and any known method for this purpose may be applied.

For example, a spin coating procedure, a dip coating procedure, a spray coating procedure, a roll coating procedure, a bar coating procedure, a die coating procedure, and/or the like may be employed.

Incidentally, conditions for contacting the hydrophilic slippery treatment agent of the present invention are not particularly limited, and any known condition for this purpose may be applied.

<Hydrophilic Slippery Coating>

(Thickness)

The thickness of a hydrophilic slippery coating formed by the application of the hydrophilic slippery treatment agent of the present invention is not particularly limited, and is preferably 0.05 g/m² or more, and more preferably 0.1 to 2 g/m².

When the coating has a thickness of less than 0.05 g/m², durability of the hydrophilic slippery property of the coating as well as the corrosion resistance of the coating may be insufficient.

(Contact Angle)

In the hydrophilic slippery coating formed by the application of the hydrophilic slippery treatment agent of the present invention, the contact angle θs of water on the coating as a measure of the hydrophilicity is preferably 60° or less, more preferably 50° or less, and still more preferably 45° or less.

When the contact angle θs is 60° or less, the hydrophilic slippery coating formed using the hydrophilic slippery treatment agent of the present invention can be sufficiently utilized in the field of contamination resistance for construction.

Further, when the contact angle θs is 45° or less, the hydrophilic slippery coating can be expected to be sufficiently utilized in the field of heat exchangers.

(Sliding Angle)

The water droplet removability of a hydrophilic slippery coating can be evaluated by a combination of the size of a sliding angle and water draining property.

In the hydrophilic slippery coating formed by the application of the hydrophilic slippery treatment agent of the present invention, the sliding angle θt of water on the coating is preferably 50° or less, more preferably 40° or less, and still more preferably 30° or less when 10 μL of water droplet is used.

It should be noted that the lower limit of the sliding angle θt of water is not particularly limited, and a lower sliding angle θt is more preferred.

(Water Draining Property)

In addition, the hydrophilic slippery coating formed by the application of the hydrophilic slippery treatment agent of the present invention has a favorable water draining property, wherein the water draining property is another measure of the water droplet removability. In other words, it is preferable that neither water screen nor water droplet can be found visually on the hydrophilic slippery coating.

<Applications>

A member having a hydrophilic slippery coating formed thereon using the hydrophilic slippery treatment agent of the present invention has both hydrophilicity and water droplet removability, and thus exerts a self-cleaning function.

Therefore, such a member can be suitably applied to applications in which both the hydrophilicity and the water droplet removability are required and the self-cleaning function is desired.

Examples of such applications include heat pump systems that use air as a heat source, and the like, and members of heat exchangers for use in transportation equipment, and the like. Among others, a member having such a hydrophilic slippery coating can be suitably used as a fin material for a heat exchanger.

Further, the hydrophilic slippery treatment agent of the present invention can be applied to a wide range of, for example, members for freezing facilities, electric transmission facilities, communication facilities, roadside facilities, or the like, or glass for transport equipment such as automobiles and vehicles, buildings, and the like, in which both the hydrophilicity and the water droplet removability are required and a self-cleaning function is desired.

EXAMPLES

Next, Examples of the present invention will be described, but the present invention is not limited to these Examples, and the like.

Examples 1 to 22, Comparative Examples 1 to 19

[Preparation of Test Plate]

(Provision of Substrate)

In Examples and Comparative Examples, either an aluminum substrate or a glass substrate was used as a substrate. Each substrate is described below.

[Aluminum Substrate]

A 1000 series aluminum substrate having a dimension of 150 mm×70 mm×0.8 mm was provided, and degreased with a 1% solution of SURFCLEANER EC370 (from Nippon Paint Surf Chemicals Co., Ltd.) at 70° C. for 5 sec.

[Glass Substrate]

A slide glass S9213 (76×52 mm) from Matsunami Glass Ind., Ltd. was used as received without degreasing or the like as a glass substrate.

(Hydrophilic Slippery Coating Forming Step)

In each entry, an organosilicon compound (A) represented by the following chemical formula (3) and a metal alkoxide (B) represented by the following chemical formula (4) were provided, in which $R^1$ to $R^4$ and m and n were specified as shown in Tables 1 and 2. The organosilicon compound (A) and the metal alkoxide (B) were blended in mole numbers specified in Tables 1 and 2, and then water and 0.01 mol/L hydrochloric acid were blended in mole numbers specified in Tables 1 and 2 for hydrolysis, to prepare a hydrophilic slippery treatment agent.

In this preparation, ethanol was used as a solvent, and the solid content was adjusted to 5% by mass. Note that in Tables 1 and 2, n=6-9, and n=9-12 mean a reagent containing a mixture of materials having n number falling within the specified range.

[Chem. 4]

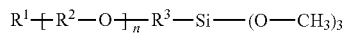
(3)

[Chem. 5]

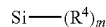
(4)

The substrate was immersed in the hydrophilic slippery treatment agent prepared above, pulled up, and then heated at 115° C. for 20 min for drying, or dried at room temperature for 1 day, as shown in Table 1, to form a hydrophilic slippery coating.

TABLE 1

| | | Organosilicon compound(A) | | | | | | Metal alkoxide | | | | | | | |
|---|---|---|---|---|---|---|---|---|---|---|---|---|---|---|---|
| | | Hydrophilic chain | | Hydrophobic chain | | | | (B) | | | | | | | |
| R1 | | Methoxy | | | 3- | 3- | | — | — | | | | | | |
| R2 | | Ethylene | | Octyl | Amino | Glycidoxy- | | — | — | | | | | | |
| R3 | | Propylene | | group | propyl | propyl | | — | — | Hydrolysis | | | | | |
| R4 | | — | — | — | — | — | — | Ethoxy | Methoxy | | | Hydro- | A/B | Drying | |
| n | | 9-12 | 10 | 6-9 | 3 | — | — | — | — | | | chloric | molar | temperature/time | Substrate |
| m | | — | — | — | — | — | — | 4 | 4 | Water | acid | ratio | | | |
| Examples | 1 | 0.07 | | | | | | 1 | | 10 | 0.001 | 0.07 | 115° C. × 20 min | Al | |
| | 2 | 0.25 | | | | | | 1 | | 55 | 0.001 | 0.25 | | Al | |
| | 3 | 0.40 | | | | | | 1 | | 100 | 0.002 | 0.40 | | Al | |
| | 4 | 0.07 | | | | | | 1 | | 10 | 0.001 | 0.07 | | Glass | |
| | 5 | 0.25 | | | | | | 1 | | 55 | 0.001 | 0.25 | | Glass | |
| | 6 | 0.40 | | | | | | 1 | | 100 | 0.002 | 0.40 | | Glass | |
| | 7 | | 0.07 | | | | | 1 | | 10 | 0.001 | 0.07 | | Al | |
| | 8 | | 0.15 | | | | | 1 | | 35 | 0.001 | 0.15 | | Al | |
| | 9 | | 0.25 | | | | | 1 | | 55 | 0.001 | 0.25 | | Al | |
| | 10 | | 0.40 | | | | | 1 | | 100 | 0.002 | 0.40 | | Al | |
| | 11 | 0.07 | | | | | | | 1 | 10 | 0.001 | 0.07 | | Al | |
| | 12 | 0.15 | | | | | | | 1 | 35 | 0.001 | 0.15 | | Al | |
| | 13 | 0 25 | | | | | | | 1 | 55 | 0.001 | 0.25 | | Al | |
| | 14 | 0.40 | | | | | | | 1 | 100 | 0.002 | 0.40 | | Al | |
| | 15 | 0.07 | | | | | | 1 | | 10 | 0.001 | 0.07 | Room | Al | |
| | 16 | 0.15 | | | | | | 1 | | 35 | 0.001 | 0.15 | temperature × 1 | Al | |
| | 17 | 0.25 | | | | | | 1 | | 55 | 0.001 | 0.25 | day | Al | |
| | 18 | 0.40 | | | | | | 1 | | 100 | 0.002 | 0.40 | | Al | |
| | 19 | | | 0.07 | | | | 1 | | 10 | 0.001 | 0.07 | 115° C. × 20 min | Al | |
| | 20 | | | 0.15 | | | | 1 | | 35 | 0.001 | 0.15 | | Al | |
| | 21 | | | 0.25 | | | | 1 | | 55 | 0.001 | 0.25 | | Al | |
| | 22 | | | 0.40 | | | | 1 | | 100 | 0.002 | 0.40 | | Al | |

TABLE 2

| | | Organosilicon compound(A) | | | | | | Metal alkoxide | | | | | | | |
|---|---|---|---|---|---|---|---|---|---|---|---|---|---|---|---|
| | | Hydrophilic chain | | Hydrophobic chain | | | | (B) | | | | | | | |
| R1 | | Methoxy | | | 3- | 3- | | — | — | | | | | | |
| R2 | | Ethylene | | Octyl | Amino | Glycidoxy- | | — | — | | | | | | |
| R3 | | Propylene | | group | propyl | propyl | | — | — | Hydrolysis | | | | | |
| R4 | | — | — | — | — | — | — | Ethoxy | Methoxy | | | Hydro- | A/B | Drying | |
| n | | 9-12 | 10 | 6-9 | 3 | — | — | — | — | | | chloric | molar | temperature/ | Substrate |
| m | | — | — | — | — | — | — | 4 | 4 | Water | acid | ratio | time | | |
| Com- | 1 | 0.00 | | | | | | 1 | | 5 | 0.001 | — | 115° C. × | Al | |
| parative | 2 | 0.03 | | | | | | 1 | | 8 | 0.001 | 0.03 | 20 min | Al | |
| examples | 3 | 0.80 | | | | | | 1 | | 150 | 0.003 | 0.80 | | Al | |
| | 4 | 2.00 | | | | | | 1 | | 300 | 0.005 | 2.00 | | Al | |
| | 5 | | 0.03 | | | | | 1 | | 8 | 0.001 | 0.03 | | Al | |
| | 6 | | 0.80 | | | | | 1 | | 150 | 0.003 | 0.80 | | Al | |
| | 7 | | 2.00 | | | | | 1 | | 300 | 0.005 | 2.00 | | Al | |
| | 8 | | 0.80 | | | | | 1 | | 150 | 0.003 | 0.80 | Room temper- | Al | |
| | 9 | | 2.00 | | | | | 1 | | 300 | 0.005 | 2.00 | ature × 1 day | Al | |
| | 10 | | | 0.03 | | | | 1 | | 8 | 0.001 | 0.03 | 115° C. × | Al | |
| | 11 | | | 0.80 | | | | 1 | | 150 | 0.003 | 0.80 | 20 min | Al | |
| | 12 | | | 2.00 | | | | 1 | | 300 | 0.005 | 2.00 | | Al | |
| | 13 | | | | 0.15 | | | 1 | | 35 | 0.001 | 0.15 | | Al | |
| | 14 | | | | 0.25 | | | 1 | | 55 | 0.001 | 0.25 | | Al | |

TABLE 2-continued

| | | Organosilicon compound(A) | | | | | Metal alkoxide (B) | | | | | | | |
|---|---|---|---|---|---|---|---|---|---|---|---|---|---|---|
| | | Hydrophilic chain | | | Hydrophobic chain | | | | | Hydrolysis | | | | |
| R1 | | Methoxy | | | | 3-Amino propyl | 3-Glycidoxy propyl | — | — | | | | | |
| R2 | | Ethylene | | Octyl | | | | — | — | | | | | |
| R3 | | Propylene | | group | | | | — | — | | | | | |
| R4 | | — | — | — | — | — | — | Ethoxy | Methoxy | | Hydro- | A/B | Drying | |
| n | 9-12 | 10 | 6-9 | 3 | — | — | — | — | — | | chloric | molar | temperature/ | |
| m | — | — | — | — | — | — | — | 4 | 4 | Water | acid | ratio | time | Substrate |
| 15 | | | | 0.40 | | | | 1 | | 100 | 0.002 | 0.40 | — | Al |
| 16 | 1.00 | | | | | | | 0 | | 140 | 0.02 | — | | Al |
| 17 | | 1.00 | | | | | | 0 | | 140 | 0.02 | — | | Al |
| 18 | | | 1.00 | | | | | 0 | | 140 | 0.02 | — | | Al |
| 19 | | | | 1.00 | | | | 0 | | 140 | 0.02 | — | | Al |
| 20 | | | | | 0.25 | | | 1 | | 55 | 0.001 | — | | Al |
| 21 | | | | | 0.40 | | | 1 | | 100 | 0.002 | — | | Al |
| 22 | | | | | | 0.25 | | 1 | | 55 | 0.001 | — | | Al |
| 23 | | | | | | 0.40 | | 1 | | 100 | 0.002 | — | | Al |
| 24 | | | | | | 1.00 | | 0 | | 140 | 0.001 | — | | Al |
| 25 | | | | | | | 0.25 | 1 | | 55 | 0.001 | — | | Al |
| 26 | | | | | | | 0.40 | 1 | | 100 | 0.002 | — | | Al |
| 27 | | | | | | | 1.00 | 0 | | 140 | 0.001 | — | | Al |

Comparative Examples 20 to 27

In each entry, an organosilicon compound (A) represented by the aforementioned chemical formula (3), in which the hydrophilic-chain-containing group including $R^1$ to $R^3$ was replaced by a hydrophobic chain specified in Table 2, and the metal alkoxide (B) represented by the chemical formula (4) described above were provided. The organosilicon compound (A) and the metal alkoxide (B) were blended in mole numbers specified in Table 2, and then water and 0.01 mol/L hydrochloric acid were blended in mole numbers specified in Table 2 for hydrolysis, to prepare a hydrophilic slippery treatment agent.
Ethanol was used as a solvent, and the solid content was adjusted to 5% by mass.
It should be noted that the hydrophilic slippery treatment agents prepared in Comparative Examples 22 and 23 had poor stability, and cured and gelled a few minutes after the preparation.
This made it impossible to make the evaluations described later for Comparative Examples 22 and 23.
[Evaluation]
The hydrophilic slippery coatings obtained above were evaluated for the hydrophilicity (contact angle θs), as well as a sliding angle θt and a water draining property as the water droplet removability in the following manner.
The results are shown in Tables 3 and 4.
(Hydrophilicity (Contact Angle θs))
As the hydrophilicity evaluation, the contact angle θs of a water droplet on the hydrophilic slippery coating formed thus was evaluated. Specifically, a test plate having the hydrophilic slippery coating formed thereon was immersed in running tap water (amount of running water: 15 kg/h) in a roam temperature environment for 10 sec, and then pulled up and dried.
Subsequently, the water contact angle was measured on the dried test plate in a room temperature environment 10 sec after the drop of water using an automated contact angle meter (model: DMO-701, from Kyowa Interface Science Co., LTD.).

The evaluation criteria are shown below.
4: 400 or less,
3: greater than 40° and 50° or less,
2: greater than 50° and 60° or less, and
1: greater than 60°
Further, the test plate having the hydrophilic slippery coating formed thereon was immersed in running tap water (amount of running water: 15 kg/h) in a room temperature environment for 24 h, and then pulled up and dried. Subsequently, the water contact angle θs of a water droplet was measured on the hydrophilic slippery coating of the dried test plate in the same manner as described above. The evaluation criteria were the same as described above.
The results of the evaluations are shown.
(Water Droplet Removability: Sliding Angle)
The sliding angle θt of water droplet on the hydrophilic slippery coating formed above was evaluated as the water droplet removability evaluation.
Specifically, a test plate having the hydrophilic slippery coating formed thereon was immersed in running tap water (amount of running water: 15 kg/h) in a room temperature environment for 10 sec, and then pulled up and dried.
Subsequently, using an automated contact angle meter (model: DMO-701, from Kyowa Interface Science Co., LTD.), 10 μL of water droplet was dropped on the dried test plate in a room temperature environment, the test plate was tilted gradually at a rate of 1°/sec from 1 sec after the drop, and the angle (water sliding angle) at which the water droplet slid was measured.
The evaluation criteria are shown below.
4: 30° or less,
3: greater than 30° and 40° or less,
2: greater than 40° and 50° or less, and
1: greater than 50°
Further, the test plate having the hydrophilic slippery coating formed thereon was immersed in running tap water (amount of running water: 15 kg/h) in a room temperature environment for 24 h, and then pulled up and dried.
Subsequently, the sliding angle θt of a water droplet on the hydrophilic slippery coating of the dried test plate was measured in the same manner as described above.

The evaluation criteria were the same as described above. The results of the evaluations are shown.

(Water Droplet Removability: Water Draining Property)

After the measurement of the sliding angle using the automated contact angle meter (model: DMO-701, from Kyowa Interface Science Co., LTD.), the trace through which the slipped water droplet had passed was visually observed, and the manner of the remaining water was evaluated according to the following evaluation criteria.

A: Neither water screen nor water droplet remaining,
B: water droplet found
C: presence of water screen, or no slippage

TABLE 3

| | | Hydrophilicity | | Water droplet removability | | | |
| | | Contact angle | | Sliding angle | | Water draining property | |
| | | After 10 sec in running water | After 24 h in running water | After 10 sec in running water | After 24 h in running water | After 10 sec in running water | After 24 h in running water |
|---|---|---|---|---|---|---|---|
| Examples | 1 | 3 | 4 | 4 | 3 | A | A |
| | 2 | 4 | 4 | 3 | 3 | A | A |
| | 3 | 4 | 4 | 4 | 3 | A | A |
| | 4 | 3 | 3 | 4 | 4 | A | A |
| | 5 | 3 | 3 | 4 | 4 | A | A |
| | 6 | 3 | 3 | 4 | 4 | A | A |
| | 7 | 3 | 4 | 4 | 3 | A | A |
| | 8 | 3 | 3 | 4 | 4 | A | A |
| | 9 | 3 | 4 | 4 | 4 | A | A |
| | 10 | 3 | 3 | 4 | 3 | A | A |
| | 11 | 3 | 4 | 4 | 3 | A | A |
| | 12 | 3 | 3 | 4 | 4 | A | A |
| | 13 | 3 | 3 | 4 | 4 | A | A |
| | 14 | 3 | 3 | 4 | 3 | A | A |
| | 15 | 4 | 4 | 4 | 4 | A | A |
| | 16 | 4 | 4 | 4 | 4 | A | A |
| | 17 | 4 | 4 | 4 | 4 | A | A |
| | 18 | 4 | 4 | 4 | 3 | A | A |
| | 19 | 3 | 4 | 3 | 3 | A | A |
| | 20 | 3 | 4 | 4 | 3 | A | A |
| | 21 | 4 | 4 | 4 | 4 | A | A |
| | 22 | 4 | 3 | 4 | 4 | A | A |

TABLE 4

| | | Hydrophilicity | | Water droplet removability | | | |
| | | Contact angle | | Sliding angle | | Water draining property | |
| | | After 10 sec in running water | After 24 h in running water | After 10 sec in running water | After 24 h in running water | After 10 sec in running water | After 24 h in running water |
|---|---|---|---|---|---|---|---|
| Comparative examples | 1 | 2 | 2 | 1 | 1 | A | C |
| | 2 | 3 | 4 | 3 | 2 | A | A |
| | 3 | 4 | 4 | 1 | 1 | B | B |
| | 4 | 4 | 4 | 1 | 1 | C | C |
| | 5 | 3 | 4 | 1 | 3 | A | B |
| | 6 | 4 | 4 | 2 | 1 | C | C |
| | 7 | 4 | 4 | 2 | 1 | C | C |
| | 8 | 4 | 4 | 1 | 2 | C | C |
| | 9 | 4 | 4 | 1 | 3 | C | C |
| | 10 | 3 | 2 | 1 | 3 | A | C |
| | 11 | 4 | 4 | 3 | 2 | C | A |
| | 12 | 4 | 4 | 3 | 1 | B | B |
| | 13 | 2 | 3 | 3 | 2 | A | A |
| | 14 | 2 | 3 | 3 | 3 | A | A |
| | 15 | 2 | 3 | 3 | 2 | A | A |
| | 16 | 4 | 4 | 1 | 1 | C | C |
| | 17 | 3 | 4 | 1 | 1 | C | C |
| | 18 | 4 | 4 | 1 | 1 | B | C |
| | 19 | 3 | 3 | 1 | 1 | C | C |
| | 20 | 1 | 1 | 3 | 2 | A | A |
| | 21 | 1 | 1 | 3 | 2 | A | A |
| | 22 | Celled | Celled | Celled | Gelled | Celled | Celled |
| | 23 | Gelled | Gelled | Celled | Gelled | Celled | Gelled |
| | 24 | 1 | 1 | 1 | 1 | C | C |
| | 25 | 2 | 2 | 1 | 1 | C | C |
| | 26 | 2 | 2 | 1 | 1 | C | C |
| | 27 | 2 | 1 | 1 | 1 | C | C |

As shown in Tables 3 and 4, the range of the molar ratio (A/B) of the organosilicon compound (A) to the metal alkoxide (B) of 0.07 to 0.4 enabled a coating having hydrophilicity concurrently with water droplet removability to be formed via drying at lower temperatures.

INDUSTRIAL APPLICABILITY

According to the hydrophilic slippery treatment agent of the present invention, a coating exhibiting both the hydrophilicity and the water droplet removability in a well-balanced manner can be produced under conditions of low temperatures without a need of baking and drying at elevated temperatures, whereas both of the hydrophilicity and the water droplet removability have been conventionally difficult to achieve concurrently.

Since the inventive hydrophilic slippery treatment agent can be dried under conditions of low temperatures, it can be suitably applied to less heat-resistant polymer substrates in the fields including food packaging materials, agricultural films, and the like.

In addition, in the building field including building exteriors and window glass, the inventive hydrophilic slippery treatment agent can exhibit its performance when applied at a building site and dried at ambient temperature.

Furthermore, since the hydrophilic slippery coating formed using the hydrophilic slippery treatment agent of the present invention, which has the hydrophilicity and the water droplet removability, exerts a self-cleaning function, the hydrophilic slippery treatment agent of the present invention can be suitably applied to applications in which both the hydrophilicity and the water droplet removability are required and the self-cleaning function is additionally desired, such as, for example, fin materials for heat exchangers.

The invention claimed is:

1. A hydrophilic slippery treatment agent, comprising:
   an organosilicon compound (A) having one silicon atom, one hydrophilic-chain- containing group represented by the following formula (1) and three hydrolyzable groups, the hydrophilic-chain-containing group and the hydrolyzable groups bonding to the silicon atom;
   a metal alkoxide (B); and
   a solvent,
   wherein one of the hydrolyzable groups is an alkoxy group, an acetoxy group, a chlorine atom, or an isocyanate group,
   the content of the organosilicon compound (A) is 0.01 to 30 mass %,
   the content of the metal alkoxide (B) is 0.01 to 30 mass %,
   wherein a metal of the metal alkoxide is Al, Fe, In, Hf, Si, Sn, or Zr,
   wherein the molar ratio (AB) of the organosilicon compound (A) to the metal alkoxide (B) is 0.07 to 0.4,

wherein $R^1$ represents a hydrogen atom, an alkyl group, an alkoxy group, a cycloalkyl group, an alkenyl group, an aromatic hydrocarbon group, or a hydroxyl group,
   $R^2$ represents an alkylene group having 1 to 5 carbon atoms, wherein in a case where a plurality of $R^2$ are present in one hydrophilic-chain-containing group, the plurality of $R^2$ are identical to or different from one another,
   n is an integer of 4 to 12, and
   $R^3$ represents an alkylene group having 1 to 5 carbon atoms.

2. The hydrophilic slippery treatment agent according to claim 1, wherein $R^2$ in the formula (1) is an ethylene group.

3. The hydrophilic slippery treatment agent according to claim 1, wherein $R^1$ in the formula (1) is an alkoxy group.

4. The hydrophilic slippery treatment agent according to claim 1, wherein $R^1$ in the formula (1) is a methoxy group.

5. The hydrophilic slippery treatment agent according to claim 1, wherein the hydrolyzable groups are alkoxy groups.

6. The hydrophilic slippery treatment agent according to claim 1, wherein the hydrolyzable groups are methoxy groups.

7. A surface treatment method, comprising a hydrophilic slippery coating forming step of contacting the hydrophilic slippery treatment agent according to claim 1 with a surface of a substrate to form a hydrophilic slippery coating.

8. The surface treatment method according to claim 7, wherein the substrate is made from aluminum.

9. The surface treatment method according to claim 7, wherein the substrate is a fin material for a heat exchanger.

10. A substrate having a hydrophilic slippery coating formed on a surface thereof by the surface treatment method according to claim 7.

11. A fin material for a heat exchanger, comprising a hydrophilic slippery coating formed on a surface thereof by the surface treatment method according to claim 7.

* * * * *